US012372969B2

(12) United States Patent
Clise et al.

(10) Patent No.: US 12,372,969 B2
(45) Date of Patent: Jul. 29, 2025

(54) LOCATION-BASED PRESENCE MODEL FOR ITEM DELIVERY

(71) Applicant: Express Scripts Strategic Development, Inc., St. Louis, MO (US)

(72) Inventors: Timothy B. Clise, Howell, MI (US); Randy L. Canis, Chesterfield, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 18/212,303

(22) Filed: Jun. 21, 2023

(65) Prior Publication Data
US 2023/0350419 A1 Nov. 2, 2023

Related U.S. Application Data

(62) Division of application No. 16/729,864, filed on Dec. 30, 2019, now Pat. No. 11,747,821.

(51) Int. Cl.
*G05D 1/02* (2020.01)
*G05B 15/02* (2006.01)
(Continued)

(52) U.S. Cl.
CPC .......... *G05D 1/0246* (2013.01); *G05B 15/02* (2013.01); *G06Q 10/06314* (2013.01);
(Continued)

(58) Field of Classification Search
CPC .......... G06Q 10/06314; G06Q 10/0832; H04L 12/2803
See application file for complete search history.

(56) References Cited

U.S. PATENT DOCUMENTS 7,710,284 B2    5/2010   Dzurko
7,869,582 B2    1/2011   Styers
(Continued)

FOREIGN PATENT DOCUMENTS

JP    2013167972 A  *  8/2013
WO   2017214669 A1    12/2017

OTHER PUBLICATIONS

Translation of JP 2013167972 A (Year: 2013).*
(Continued)

*Primary Examiner* — Mehmet Yesildag
*Assistant Examiner* — Jeremy L Gunn
(74) *Attorney, Agent, or Firm* — The Small Patent Law Group

(57) ABSTRACT

Methods and systems for prescription drug shipping selection are provided. The methods and systems include operations comprising: obtaining, by a server, activity data from a plurality of devices associated with a location, the activity data representing different types of activities that take place at the location over a threshold period of time; aggregating, by the server, the activity data to generate a location-based presence model for the location, the location-based presence model indicating likelihoods that a person is present at the location at a plurality of different time windows; and identifying, by the server, based on the location-based presence model, a time window for delivery of a perishable item to the location.

20 Claims, 10 Drawing Sheets

(51) Int. Cl.
*G05D 1/00* (2006.01)
*G06Q 10/0631* (2023.01)
*G06Q 10/08* (2023.01)
*G06Q 10/0832* (2023.01)
*H04L 12/28* (2006.01)

(52) U.S. Cl.
CPC ......... *G06Q 10/08* (2013.01); *G06Q 10/0832* (2013.01); *H04L 12/2803* (2013.01)

(56) References Cited

U.S. PATENT DOCUMENTS

| | | |
|---|---|---|
| 8,035,479 B2 | 10/2011 | Tran |
| 8,358,197 B2 | 1/2013 | Tran |
| 8,600,903 B2 | 12/2013 | Eller |
| 9,244,147 B1 | 1/2016 | Soundararajan |
| 9,269,249 B2 | 2/2016 | Amis |
| 9,384,668 B2 | 7/2016 | Raptopoulos |
| 9,508,239 B1 * | 11/2016 | Harrison ............ G08B 13/248 |
| 9,536,216 B1 | 1/2017 | Lisso |
| 9,561,871 B2 | 2/2017 | Sugumaran |
| 9,573,684 B2 | 2/2017 | Kimchi |
| 9,659,502 B1 | 5/2017 | Abebe |
| 9,747,901 B1 | 8/2017 | Gentry |
| 9,777,502 B2 | 10/2017 | Curlander |
| 9,801,517 B2 | 10/2017 | High |
| 9,873,408 B2 | 1/2018 | Capizzo |
| 10,049,545 B2 | 8/2018 | Welsh |
| 10,139,817 B2 | 11/2018 | High |
| 10,198,708 B2 | 2/2019 | Mattingly |
| 10,293,938 B2 | 5/2019 | Thompson |
| 10,351,239 B2 | 7/2019 | Di Benedetto |
| 10,403,155 B2 | 9/2019 | Kimchi |
| 10,405,198 B2 | 9/2019 | Carpenter |
| 10,486,883 B2 | 11/2019 | Winkle |
| 10,514,690 B1 | 12/2019 | Siegel |
| 10,515,555 B2 | 12/2019 | High |
| 10,538,327 B2 | 1/2020 | High |
| 10,600,020 B2 | 3/2020 | Stenneth |
| 10,614,503 B2 | 4/2020 | High |
| 10,807,714 B2 | 10/2020 | Atchley |
| 10,874,240 B2 | 12/2020 | Lewis |
| 11,053,021 B2 | 7/2021 | Di Benedetto |
| 11,066,186 B2 | 7/2021 | Walsh |
| 11,257,023 B1 * | 2/2022 | Rafii .................. H04L 67/52 |
| D965,950 S | 11/2022 | Engler |
| D981,451 S | 3/2023 | Clements |
| D993,260 S | 7/2023 | Anand |
| 11,727,532 B1 | 8/2023 | Demarco |
| 2002/0053975 A1 | 5/2002 | Fitzgibbon |
| 2004/0135031 A1 | 7/2004 | Stupakis |
| 2010/0004802 A1 | 1/2010 | Bodin |
| 2012/0078673 A1 | 3/2012 | Koke |
| 2013/0293368 A1 | 11/2013 | Ottah |
| 2014/0032034 A1 | 1/2014 | Raptopoulos |
| 2014/0101082 A1 * | 4/2014 | Matsuoka ............ G06N 20/00 706/12 |
| 2015/0120598 A1 | 4/2015 | Fadell |
| 2015/0142140 A1 * | 5/2015 | Yamaguchi ......... H04L 12/2803 700/50 |
| 2015/0156031 A1 * | 6/2015 | Fadell ................. G08B 27/003 700/90 |
| 2016/0033966 A1 | 2/2016 | Farris |
| 2016/0189101 A1 | 6/2016 | Kantor |
| 2016/0307449 A1 | 10/2016 | Gordon |
| 2017/0011333 A1 | 1/2017 | Greiner |
| 2018/0155011 A1 | 6/2018 | Greiner |
| 2018/0175349 A1 | 6/2018 | Hummer |
| 2018/0215546 A1 | 8/2018 | High |
| 2018/0247366 A1 * | 8/2018 | Bailey ................. G06Q 10/083 |
| 2018/0283100 A1 | 10/2018 | Hall |
| 2018/0357871 A1 * | 12/2018 | Siminoff ............. G08B 13/189 |
| 2018/0364740 A1 | 12/2018 | Collins |
| 2019/0012631 A1 | 1/2019 | Chatani |
| 2019/0079509 A1 | 3/2019 | Bosworth |
| 2019/0087696 A1 * | 3/2019 | Verhoeven ............ G08B 29/18 |
| 2019/0089934 A1 * | 3/2019 | Goulden ................. G08B 7/06 |
| 2019/0112049 A1 | 4/2019 | Phan |
| 2019/0139254 A1 * | 5/2019 | Mochizuki ......... G06F 3/147 |
| 2019/0180237 A1 | 6/2019 | Mattingly |
| 2019/0197643 A1 | 6/2019 | Cochran |
| 2019/0197646 A1 | 6/2019 | Prager |
| 2019/0299802 A1 | 10/2019 | Neubecker |
| 2019/0300202 A1 | 10/2019 | High |
| 2019/0340569 A1 | 11/2019 | Prager |
| 2019/0354220 A1 | 11/2019 | Ribbich |
| 2020/0017237 A1 | 1/2020 | Walker |
| 2020/0175471 A1 | 6/2020 | Tsuruta |

OTHER PUBLICATIONS

C. Debes, A. Merentitis, S. Sukhanov, M. Niessen, N. Frangiadakis and A. Bauer, "Monitoring Activities of Daily Living in Smart Homes: Understanding human behavior," in IEEE Signal Processing Magazine, vol. 33, No. 2, pp. 81-94, Mar. 2016, doi: 10.1109/MSP.2015.25038 (Year: 2018).*

C. Debes, A. Merentitis, S. Sukhanov, M. Niessen, N. Frangiadakis and A. Bauer, "Monitoring Activities of Daily Living in Smart Homes: Understanding human behavior," in IEEE Signal Processing Magazine, vol. 33, No. 2, pp. 81-94, Mar. 2016, doi: 10.1109/MSP.2015.2503881 (Year: 2016).*

English translation of JP 2013167972 A (Year: 2013).*

* cited by examiner

| ACTIVITY DATA | PRESENCE LIKELIHOOD |
|---|---|
| DOOR OPENING, LIGHT SWITCH ACTIVATED, REFRIGERATOR OPENING, TV TURNED ON | HIGH |
| DOOR OPENING, TV TURNED ON | MEDIUM |
| GARAGE DOOR OPENING, REMAINING DEVICES REPORTING ON ACTIVITY | LOW |
| GARAGE DOOR OPENING, LIGHT SWITCH TURNED OFF | LOW |
| GARAGE DOOR OPENING, LIGHT SWITCH TURNED ON | MEDIUM |
| VOICE ACTIVATED DEVICE BEING OPERATED, REMAINING DEVICE REPORTING NO ACTIVITY | HIGH |
| DOOR OPENING AND WITHIN 5 MINUTES TV TURNED ON | HIGH |
| GARAGE DOOR OPENING, LIGHT SWITCH TURNED ON MANUALLY | HIGH |
| SMART KITCHEN DEVICE OPERATED | HIGH |

*FIG. 3*

| TIME WINDOWS | 1 | 2 | 3 | 4 |
|---|---|---|---|---|
| ACTIVITY 1 | X | O | O | X |
| ACTIVITY 2 | O | O | O | X |
| ACTIVITY 3 | O | O | O | X |
| ACTIVITY 4 | X | X | O | X |
| ACTIVITY 5 | X | X | O | X |
| ACTIVITY 6 | O | O | O | X |
| ACTIVITY 7 | X | O | O | X |
| ACTIVITY 8 | X | X | O | X |
| ACTIVITY 9 | O | | | |
| PRESENCE LIKELIHOOD | MEDIUM | LOW | LOW | HIGH |

*FIG. 4A*

Select Devices Which You Allow to Share Presence Information

○ Garage Door — Presence Rank

○ Door Camera/Accelerometer — Presence Rank

Level of Information to be Shared By Device

○ Refrigerator — Presence Rank

○ Light Switches — Presence Rank

○ Voice Activated Assistant (Response System) — Presence Rank

○ Home Security Activation/Deactivation — Presence Rank

*FIG. 5*

Select Time Window For Perishable Item Delivery Sorted by Presence Likelihood

Free Delivery

LOCATION-BASED PRESENCE MODEL FOR ITEM DELIVERY

CROSS REFERENCES TO RELATED APPLICATIONS

This application is a divisional of U.S. application Ser. No. 16/729,864, which was filed Dec. 30, 2019. The entire disclosure of said application is incorporated herein by reference.

This application references commonly-owned U.S. Pat. No. 8,600,903 issued to Charles Eller, filed Jun. 14, 2007, which is hereby incorporated by reference herein.

This application references commonly-owned Jacob J. Reinhardt U.S. patent application Ser. No. 14/630,373, filed Feb. 24, 2015, which is hereby incorporated herein by reference.

FIELD

The field relates to systems and methods for generating a location-based presence model used for transporting and delivering perishable items.

BACKGROUND

Mail order pharmacies provide a convenient and cost-effective option for patients to receive prescription drugs. For example, a mail order pharmacy may be capable of taking advantage of economies of scale, volume dispensing of prescription drugs, and centralized warehousing and shipping to reduce the cost of prescription drugs purchased by patients of the mail order pharmacy. Some types of prescription drugs may have temperature-related storage and handling requirements in order to maintain the safety and efficacy of the drugs. Such drugs may typically be shipped from a mail order pharmacy to the patient, doctor, nurse, treatment facility, or the like using insulated and/or temperature-controlled shipping containers.

BRIEF DESCRIPTION OF THE DRAWINGS

FIGS. 3, 4A and 4B are examples of activity data associated with presence likelihoods, according to some embodiments.

FIGS. 5-6 are illustrative inputs and outputs of the location-based presence model system, according to some embodiments.

DETAILED DESCRIPTION

Figure 1:
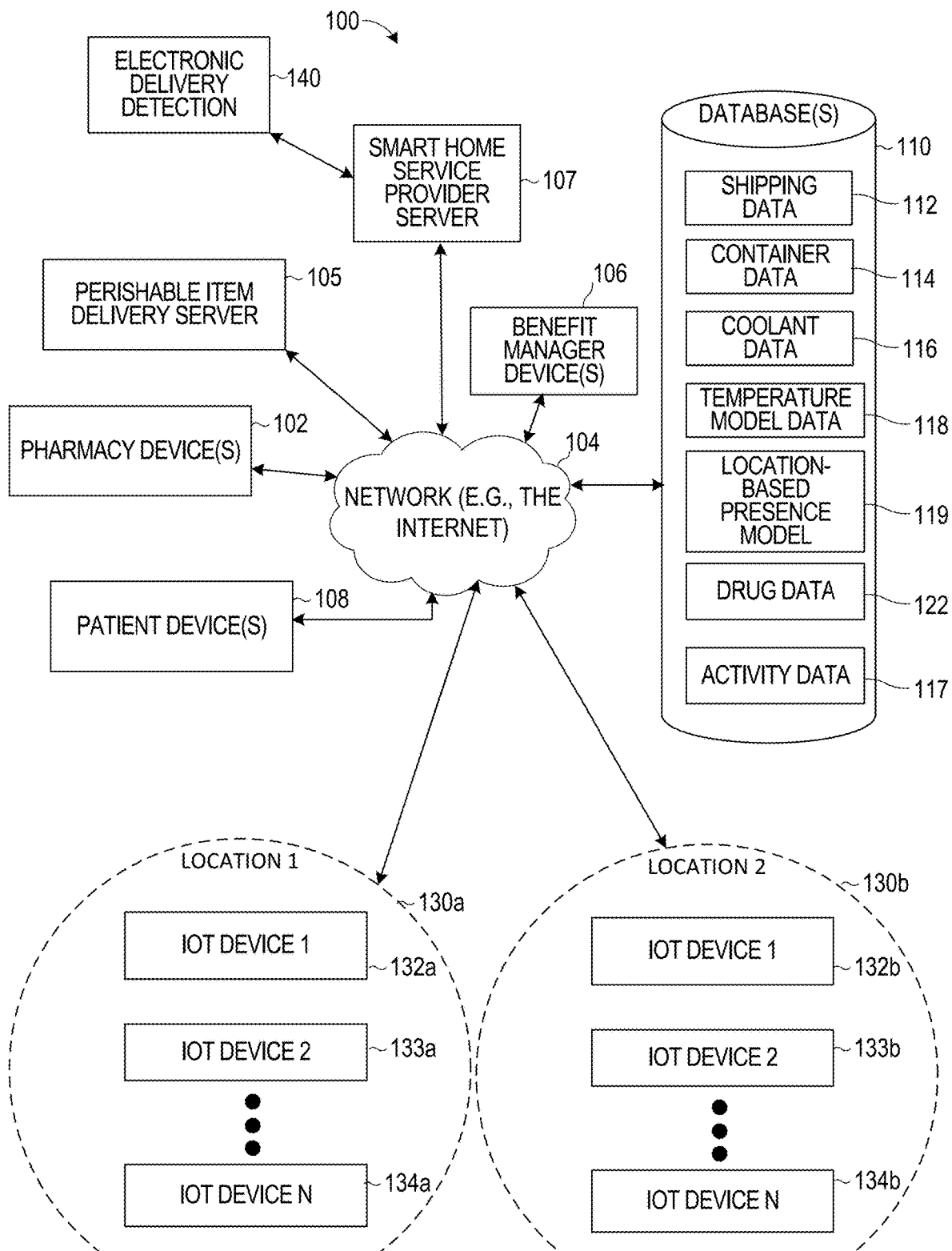
FIG. 1 is a block diagram of an example system, according to some embodiments.

Example methods and systems for perishable item delivery window identification and model development are described. In the following description, for purposes of explanation, numerous specific details are set forth in order to provide a thorough understanding of example embodiments. It will be evident, however, to one of ordinary skill in the art that embodiments of the invention may be practiced without these specific details.

Transporting or transferring objects from one place to another involves considerations of combinations of factors that can be taken into account to ensure the proper and efficient transport of such objects. The factors and considerations, of course, vary depending on the object(s) desired to be transported. For example, physical properties and characteristics, such as weight, size, the physical constitution or make up, and the conditions under which an object should be transported, are some of the parameters that can be considered when one is deciding on the best method for shipping any particular object. Other factors that can be taken into consideration include the parameters of the container to be employed, such as the make up or constitution of the container to be used, the type and amount of cooling or heating, if any, that should be provided for a substance to be transportation, the distance that an object is to be transported, and the weather and environmental conditions that an object or container may be exposed to during its journey, including susceptibility to being altered in different weather conditions and climates.

For many temperature or environmentally sensitive perishable items, such as foods, drugs, body organs, and material samples, it is often desirable to maintain a specific constant temperature, or range of temperatures, during transportation or storage of such objects. In addition, the shipment of multiple temperature sensitive objects in one container, where an object or each object is required to be maintained at a different temperature, may be required in the course of transport of objects for medical and scientific research or use. For example, certain drugs may be required to stay above or below certain different threshold points. The quantity of material which can be shipped may sometimes be of such small size that delivery by express or courier service is feasible and cost effective, so long as each object can be maintained at its own allowable temperature range, its temperature threshold, either maximum temperature threshold or minimum temperature threshold. Refrigerating or self-heating containers generally provide relatively constant temperatures or temperature ranges for such products, but tend to be bulky, heavy, and complicated to operate.

In many cases, the manner in which such perishable items are transported to an end consumer depends on an expected amount of time the item will be left unattended after being delivered to avoid spoilage. Namely, the packaging of the perishable items and the mode of transport are selected with the expectation that the item will be left unattended at a delivery location, such as on a doorstep or porch, for a maximum period of time (e.g., 8 hours). Such packaging can be very expensive and the mode of transportation can become cost prohibitive. Such expenses are typically passed down to the end consumer or incurred by the provider as part of a client service guarantee, which raises the overall cost of the perishable items. Sometimes, an end consumer can select a particular day on which the perishable items can be delivered with the expectation that someone at the consumer's delivery location will be present to receive the perishable item and appropriately store the item (e.g., place the item in the refrigerator). However, even when consumers specify particular days/times to have the items delivered, the delivery service cannot be assured that someone will be at the delivery location (e.g., at a particular time) to receive the items. Accordingly, the delivery service still ends up wasting resources on packaging and transportation to avoid spoilage of the perishable items. Examples of perishable items can include expensive items, such as perishable drugs including specialty drugs that can cost $1,000, $10,000 or even $100,000 for a particular shipment. Some drugs can also be less effective when they are exposed to temperatures outside a threshold, e.g., heat or cold. It can be important to ensure efficient delivery of drugs to provide safe and effective drugs to patients.

The disclosed embodiments provide systems and methods to generate a location-based presence model that identifies one or more than one time windows in which a likelihood of a person being present at a delivery location exceeds a threshold. Specifically, the disclosed embodiments obtain, by a server, activity data from multiple devices, such as smart home systems, associated with a location, such as a user's residence. The activity data represents different types of activities that take place at the location over a threshold period of time, such as activities that take place over 3-4 weeks or more. The server aggregates the activity data to generate a location-based presence model for the location indicating likelihoods that a person is present at the location during multiple different time windows. The server identifies, based on the location-based presence model, a time window for delivery of a perishable item to the location. In this way, the delivery service, in communication with the server, is provided with a measure of assurance (likelihood exceeding a threshold) that a person will be at the delivery location during a specified window of time. Based on this measure of assurance, the delivery service can select delivery parameters for delivering perishable items that consume fewer overall resources (e.g., less expensive packaging and delivery modes) than conventional methods. This reduces the overall cost and system resources needed to accomplish a task of delivering perishable items to a consumer and improves the overall efficiencies of the devices, such as by reducing the amount of resources needed to package items for long expected porch times and reducing the number of transportation modes needed to deliver the items. Also, by aggregating information indicative of home presence without obtaining specific details from smart home systems that include Internet-of-Things (IoT) devices, such as doorbells, home camera systems, smart lights, garage door openers, etc.), better and safer home delivery of perishable items can be ensured while limiting impingement on a consumer or homeowner's privacy.

In some embodiments, the location-based presence model can be used to suggest a delivery method, date, and/or time during which the consumer, such as a patient, is most likely to be at the delivery location (e.g., at home), to receive the perishable item, such as a drug. The location-based presence model can also be used to alter how the perishable item is packaged for shipment. The location-based presence model can also be used to offer a discount (e.g., free expedited shipping) to a consumer who agrees to be present to receive the drug at a particular time or window of time that is pre-selected based on the location-based presence model. The pre-selection may, for example, be performed without input from the user. The agreement from the user to be present can be received from an end-user device (e.g., a user device, such as a patient device).

FIG. 1 is a block diagram of an example system 100, according to an example embodiment. The system 100 is an example embodiment in which the packaging and/or shipment of perishable items (e.g., temperature sensitive drugs) may be managed based on a location-based presence model. The disclosed embodiments are discussed in relation to temperature sensitive drugs but are similarly applicable to any other type of perishable items, such as groceries, food, body organs, flowers, and so forth. In some embodiments, other non-perishable items that are to be maintained with a temperature range including musical instruments, animals, cosmetics, and the like may similarly be managed be packaged and/or shipped. The system 100 includes a pharmacy device 102 in communication with a benefit manager device 106 over a network 104. The system may also include a patient device 108, a perishable item delivery server 105, an electronic delivery detection 140, a smart home service provider server 107, a database(s) 110, and/or one or more than one locations 130a and 130b.

The pharmacy device 102 may include hardware and/or software of a mail order pharmacy and/or or a retail pharmacy to enable the pharmacy to fulfill prescription drug orders. The pharmacy device 102 may be operated in an automated manner, as directed by an operator (e.g., a pharmacist or pharmacist technician), or otherwise. Examples of pharmacy operations that may be performed by pharmacy device 102 include filling a prescription after removing pharmaceuticals from inventory, labeling a container or other packaging with prescription information, filling the container or other packaging with the pharmaceutical, verifying the type and quantity of the pharmaceutical in the container with that which is printed on the label, and the like. In some embodiments, the pharmacy device 102 may be used to determine how to select and prepare a shipping container to deliver prescription drugs (e.g., via parcel delivery, mail delivery, and the like).

In some embodiments, the pharmacy device 102 may be a device associated with a retail pharmacy location (e.g., an exclusive pharmacy location, a grocery store with a retail pharmacy, or a general sales store with a retail pharmacy), a drug fulfilling kiosk, or other type of pharmacy location from which an individual (e.g., as a patient of a pharmacy and/or a member of a benefit plan) attempts to obtain a prescription. In some embodiments, the pharmacy device 102 may be utilized by the pharmacy to submit the claim to the pharmacy benefit manager (PBM device 106) for adjudication (e.g., when the patient of the pharmacy is a member of a benefit plan offered by the PBM device 106). Additionally, in some embodiments, the pharmacy device 102 may enable information exchange between the pharmacy and the PBM device 106, for example, to allow the sharing of member or patient information such as drug history, and the like, that may allow the pharmacy to better service a member (e.g., by providing more informed therapy consultation and drug interaction information).

In some embodiments, the pharmacy device 102 may be associated with a mail order pharmacy. The mail order pharmacy may fill or refill the prescription, and may deliver the prescription drug to the member via a parcel service in accordance with an anticipated need, such as a time-wise schedule, or the like. As such, a person or patient may not need to visit the retail pharmacy store in person to have the prescription refilled and/or to pick up the refilled prescription. In addition to the convenience of receiving the refills of the prescription directly to the patient's home or other designated location of delivery, the cost of the prescription drugs purchased through a mail order delivery pharmacy may be less than the cost of the same prescription drugs purchased from a retail pharmacy. The lower costs available through the mail order pharmacy may be the result, for example, of economies of scale available to the mail order pharmacy that may be at least partially passed along to the member as well as the savings realized by the client. The lower costs available through the mail order pharmacy may be the result of a lower co-pay required by the patent in the role of a member of a health care plan, under which the member may receive the prescription drugs.

Examples of the network 104 include Mobile Communications (GSM) network, a code division multiple access (CDMA) network, 3rd Generation Partnership Project (3GPP), 4th Generation Partnership Project (4GPP), an Internet Protocol (IP) network, a Wireless Application Protocol (WAP) network, a WiFi network, or an IEEE 802.11 standards network, as well as various combinations thereof. The network 104 may include optical communications. The network 104 may be a local area network (LAN) or a global communication network, such as the Internet. Other conventional and/or later developed wired and wireless networks may also be used. In some embodiments, the network 104 may include a prescribing network. An example of a prescribing network is the Surescripts™ network.

The benefit manager device 106 is a device operated by an entity at least partially responsible for creation and/or management of the pharmacy or drug benefit. While the benefit manager operating the benefit manager device 106 is typically a PBM, other entities may operate the benefit manager device 106 on behalf of themselves, the PBM, or another entity. In some embodiments, a PBM device 106 that provides the pharmacy benefit may also provide one or more than one additional benefits including a health benefit, a dental benefit, a vision benefit, a wellness benefit, a radiology benefit, a pet care benefit, an insurance benefit, a long term care benefit, a nursing home benefit, and the like.

Some of the operations of the PBM that operates the benefit manager device 106 may include the following. A member (or a person on behalf of the member) of a pharmacy benefit plan administered by or through the PBM attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of mechanical, electrical, and/or computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending account (FSA) of the member or the member's family, or the like. An employer of the member may directly or indirectly fund or reimburse the member or an account of the member for the co-pay. The co-pay can be flagged in a patient data record for differing amounts depending on whether the patient has elected to use the presence model, as described herein.

The amount of the co-pay paid by the member may vary by the benefit plan of the client with the PBM. The member's co-pay may be a flat co-pay (e.g., $10), co-insurance (e.g., 9%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug. In some embodiments, the amount of the co-pay may be flagged in the member record for reduction if the member chooses to share information from IoT devices associated with the member's location. For example, the member may be associated with a first location 130*a* which includes multiple IoT devices 132*a*, 133*a*, and 134*a*. Namely, the first location 130*a* may be the member's home and the IoT devices 132*a*, 133*a*, and 134*a* may be different devices (e.g., a doorbell, garage door opening system, voice response system, thermostats, furnace settings, and light switches) that provide activity data within the member's home that are connected to the network 104 and can share information with servers 105 and/or 107. If the member allows the servers 105 and/or 107 to access some or all the activity data generated by the IoT devices 132*a*, 133*a*, and 134*a*, the member' record may be flagged to receive something of value (e.g., a discount on the co-pay or expedited shipping at no additional cost). While member is being used throughout this disclosure to refer to a person ordering and/or receiving objects, patient may also be used interchangeably with member and should be understood to have the same meaning unless otherwise indicated.

In some cases, the servers 105 and/or 107 use the activity data generated by the IoT devices 132*a*, 133*a*, and 134*a* to generate a location-based presence model for the first location 130*a*. The location-based presence model indicates likelihoods that a person is present (e.g., available to receive a delivery of a perishable item) during different time windows at the location 130*a*. The servers 105 and/or 107 automatically identify a time window in which a member can receive a shipment based on the location-based presence model. In some embodiments, the automatic identification of a time window occurs without input from the member or other person.

The identified time window (e.g., as predicted by the location-based presence model 119) may be a time window having a greatest likelihood of a person being present at the first location 130*a*. The member may receive a benefit, e.g., points in an award program, discount on the co-pay or shipping costs, reduction in medical visits or care, free home health checkups, or the like, if the member chooses to accept delivery during the identified time window from multiple different time windows (e.g., through the patient device 108). In some cases, the identified time window may be used to generate or optimize a delivery path for one or more than one objects, such as to limit exposure of the objects or items to outside temperatures. The identified time windows may also be used to plan delivery of the item based on a cost of the item, traffic, and crime reports in the area to which the item is delivered.

In some embodiments, the smart home service provider server 107 and the perishable item delivery server 105 are operated by a single entity. In other embodiments, the smart home service provider server 107 and the perishable item delivery server 105 are operated by different entities. In some embodiments, the smart home service provider server 107 and the perishable item delivery server 105 are jointly operated (e.g., on a single device or on a pool of devices), while in other embodiments, the smart home service provider server 107 and the perishable item delivery server 105 are operated separately.

In conjunction with receiving the co-pay (if any) from the member and dispensing the prescription drug to the member, the pharmacy submits a claim to the PBM device 106 for the prescription drug. The PBM device 106 may perform certain adjudication operations including verifying the eligibility of the member, reviewing the formulary of the member to determine appropriate co-pay, coinsurance, and deductible for the prescription drug, and performing a drug utilization review (DUR) on the member. The PBM device 106 then provides a response to the pharmacy following performance of the aforementioned operations. As part of the adjudication, the plan sponsor (or the PBM device 106 on behalf of the plan sponsor) ultimately reimburses the pharmacy for filling the prescription drug when the prescription drug is successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, the object delivered is paid for on a cash basis, e.g., no co-pay review is performed in the servers. However, in the example of drug delivery, the servers can conduct a drug interaction review or drug utilization (DUR) review. The delivery of the objects can be performed using the delivery models can be performed upon receipt of the order of the objects or upon completion of some order review tasks.

In some embodiments, the pharmacy device 102 and/or the benefit manager device 106 are operated by a single entity. In other embodiments, the pharmacy device 102 and/or the benefit manager device 106 are operated by different entities. In some embodiments, the pharmacy device 102 and/or the benefit manager device 106 are jointly operated (e.g., on a single device or on a pool of devices), while in other embodiments, the pharmacy device 102 and the benefit manager device 106 are operated separately.

The patient device 108 is used by a device operator. The device operator may be an individual acting as a patient of a pharmacy, a member of a drug benefit program, or otherwise. While some illustrative embodiments may generally describe the device operator as a member, the device operator may be an individual not in the role of a member. In some embodiments, the device operator may be a patient of a pharmacy who is not a member of the PBM. In addition, the device operator may be another person operating the patient device 108 on behalf of the member. Examples of such people include parents, guardians, and caregivers. While the member is generally described herein as being the device operator, generally any of the aforementioned persons or patients may be substituted for the member (e.g., for operating the device).

In some embodiments, the member may utilize the patient device 108 to communicate with the benefit manager (e.g., through the benefit manager device 106) or a pharmacy (e.g., through the pharmacy device 102). By way of example, the patient device 108 may communicate with the benefit manager device 106 to enable a member to have a prescription filled through a pharmaceutical delivery channel. The member operating the patient device 108 may be a person who has one or more than one prescription drugs prescribed to them by a medical healthcare professional or other prescriber.

The patient device 108 may be associated with a single member or with multiple members. A member may use multiple patient devices. In some embodiments, the communication may not be made to the member directly through the patient device 108. For example, the member may get blocked at a retail pharmacy location from receiving a prescription drug under the drug benefit program associated with the member and then receive the notification from the pharmacist regarding the blockage. The member may also receive a letter in the mail or by email explaining the blockage.

In some embodiments, the patient device 108 may be a smartphone or desktop computer. The patient device 108 may present to the member a list of possible time windows in which the member may have a perishable item, such as a drug, delivered to the member's location (e.g., the first location 130a or second location 130b). The list of possible time windows may be presented based on a location-based presence model 119 that indicates various likelihoods of a person being present at the delivery location. In some cases, the list of possible time windows is sorted and/or ranked based on the likelihoods provided by the location-based presence model 119. For example, if the location-based presence model 119 indicates that there is a high likelihood (e.g., a likelihood that exceeds a threshold) that a person is present at the first location 130a between 1-3 PM, the time window of 1-3 PM may be presented at the top of the list or otherwise highlighted on a display screen. Similarly, if the location-based presence model 119 indicates that there is a medium likelihood (e.g., a likelihood that is between a first threshold and a second threshold) that a person is present at the first location 130a between 9-11 AM, the time window of 9-11 AM may be presented second in the list. If the location-based presence model 119 indicates that there is a low likelihood (e.g., a likelihood that is less than a second threshold) that a person is present at the first location 130a between 3-5 PM, the time window of 3-5 PM may be presented at the bottom of the list. The delivery time window can be greater or less than two hours in duration. The patient device 108 may be used by the member to select a time window from the list of time windows in which the perishable item is delivered by the perishable item delivery server 105.

The pharmacy device 102 and/or the benefit manager device 106 may be in communication directly (e.g., through local storage) and/or through the network 104 (e.g., in a cloud configuration or software as a service) with a memory device that stores a database 110. The database 110 may be deployed on: the pharmacy device 102, the benefit manager device 106, the perishable item delivery server 105, and the smart home service provider server 107; the pharmacy devices 102, the benefit manager device 96, the perishable item delivery server 105, and the smart home service provider server 107; partially on the pharmacy device 102 and partially on the benefit manager device 106, partially on the perishable item delivery server 105, and partially on the smart home service provider server 107; on a separate device, or may otherwise be deployed. In some cases, the perishable item delivery server 105 and/or the smart home service provider server 107 may be included in a portion of the pharmacy device 102. The database 110 may store shipping data 112, container data 114, coolant data 116, temperature model data 118, location-based presence model 119, activity data 117, and drug data 122.

In general, the shipping data 112 may include information regarding the pricing of various shipping modes offered by multiple different shipping carriers. The various shipping modes may include combinations of transport duration and transport type. Transport duration may include, for example, next day shipping, second day shipping, third day shipping, and so forth. Transport type may include, for example, air shipping transport, ground shipping transport, hand carrier delivery, and so forth. The pricing of the various shipping modes may additionally include pricing information based on different package weights, sizes, and/or types, and may be imposed with different charges (e.g., fuel surcharge, residential delivery charge, delivery area surcharge, Saturday delivery charge, etc.) by the different shipping carriers. Additionally, the different shipping carriers may price differently. For example, the base shipping charge may be a different price, and additionally one of the carriers may charge an additional special fee for a particular delivery location while the other may not or may charge a different special fee for a different reason. In some embodiments, the shipping data 112 may also include information regarding pick-up times and/or delivery times for individual shipping modes and/or carriers. In some embodiments, the shipping data 112 may additionally include a route of transit, a specific shipping service associated with a given item or item type, and/or relationships that define which shipping services to use for various items. For example, the shipping data 112 may specify a universal preference for shipping items or client specific preference for shipping items. Specifically, shipping government related items may require use of a specific shipping service (e.g., DHL) and certain clients may have preference for other shipping services (e.g., FedEx or the Post Office).

The shipping data 112 may be created and stored by the pharmacy operating the pharmacy device 102, the benefit manager operating the benefit manager device 106, and/or one, or more than one, shipping carrier. For example, the shipping carrier may store the shipping data 112 associated with itself directly in the database 110 or may provide information to the pharmacy such that the pharmacy device stores the provided information in the form of the shipping data 112. The shipping data 112 may include data provided by the shipping carriers, data generated by the pharmacy device 102 and/or the benefit manager device 106 regarding the shipping carriers and/or its services, or otherwise.

The container data 114 may include information regarding different available insulated shipping containers utilized by the mail order pharmacy for shipping temperature sensitive drugs. The shipping container information may include, for example, the different available cooler sizes, the weight of each of the different available cooler sizes, the cost of each of the different available cooler sizes, and the size (e.g., physical external dimensions, physical internal dimensions, physical internal volume, shipping mode specific dimensional weight, shipping mode specific dimensional volume, and/or maximum weight carrying capacity) of each of the different available cooler sizes. Additional information, such as insulating characteristics (e.g., wall thickness, K value, and/or R value) of each of the different cooler sizes may also be stored as part of the container data 114. The container data 114 may include data provided by the shipping carriers, data provided by the container manufacturers, data generated by the pharmacy device 102 and/or the benefit manager device 106 regarding the containers and/or its manufacturers, or otherwise.

The coolant data 116 may include, for example, information regarding the available phase change units that may be utilized by the pharmacy for shipping temperature sensitive drugs. Examples of phase change units may include, for example, frozen gel packs, which may undergo a phase change or partial phase change to liquid form while absorbing heat and maintaining constant temperature within a cooler, and liquefied gel packs, which may undergo a phase change or partial phase change to solid form while releasing heat and maintaining constant temperature within a cooler. The coolant data 116 may include, for example, the weight of each frozen and/or liquefied gel pack, the cost of each frozen and/or liquefied gel pack, the physical dimensions of each frozen and/or liquefied gel pack, and/or the volume of each frozen and/or liquefied gel pack. In some embodiments, multiple sizes (e.g., physical dimensions and/or weight) of frozen and/or liquefied gel packs, and/or types (e.g., different chemical compositions and/or melting points) of frozen and/or liquefied gel packs are used. The coolant data 116 may include data provided by the shipping carriers, data provided by the container manufacturers, data provided by the phase change unit manufacturers, data generated by the pharmacy device 102 and/or the benefit manager device 106 regarding the phase change unit and/or its manufacturers, or otherwise.

The temperature model data 118 may include experimentally obtained and/or determined information regarding the different internal temperature vs. time profiles associated with different cooler, external temperature, and frozen and/or liquefied gel pack combinations. For example, the temperature model data 118 may include experiment information regarding the duration for which a specified temperature (e.g., which may include a specified temperature range, and/or a temperature below a specified threshold temperature) may be maintained within different sized coolers having different numbers of frozen gel packs (and/or liquefied gel packs, and/or combinations of frozen and liquefied gel packs) disposed within the cooler under different external conditions and different durations. In some embodiments, the temperature model data 118 may include temperature modeling equations utilizing the many aforementioned variables (e.g., cooler, gel packs, external conditions, and duration). Additional variables or a lesser number of variables may also be used. In some embodiments, the temperature model data 118 may be utilized for improving accuracy through experimental results (e.g., by modifying a variable within the temperature modeling equations to achieve equivalent internal temperature profiling given an external temperature, cooler, and frozen and/or liquefied gel pack combination). In other embodiments, the temperature model data 118 may be exclusively based on experimental results. In such a model, a very large array of experimental results may be collected, as there may be many variables that affect the internal temperature of a cooler, and many possibilities of external temperature profiles. By way of example, the very large array may include more than one hundred thousand results, more than one million experimental results, at substantially all of the results associated with a single client of a PBM during a time period (e.g., three months, six months, a year), at least substantially all of the results associated with multiple clients of a PBM during a time period, or the like. In some embodiments, the temperature model data 118 may be received from the Food and Drug Administration (FDA), directly from the manufacturer, or otherwise, and stored in the database 110.

The drug data 122 may include drug name (e.g., technical name and/or common name), other names by which the drug is known by, active ingredients, an image of the drug (e.g., in pill form), and the like. The drug data 122 may include a dosage format (e.g., pill, spray, or liquid) and/or the packaging formats (e.g., filled bottle, filled blister packaging, or pre-filled unit of use packaging), that are available to or for the drug. The drug data 122 may include information associated with a single medication or multiple medications.

The drug data 122 may include information regarding each drug that may require temperature-controlled storage. The information regarding the drugs may include, for example, the size of different containers for the drug, the weight of the drug, and a recommended storage temperature for the drug. The size of the different containers for the drug may include, for example, the physical dimensions of each container and/or the volume of the container. The weight of the drug may include, for example, the combination weight of the drug and packaging container. The recommended storage temperature may include, for example, a minimum storage temperature, a maximum storage temperature, and the like. In some embodiments, the drug data 122 may additionally include drug information related to allowable excursion outside of the recommended storage temperature range (e.g., absolute minimum temperature, allowed duration below the minimum storage temperature, absolute maximum temperature, and/or allowed duration above the maximum storage temperature). The drug data 122 may include data provided by the drug manufacturers, data provided by governmental organizations, data generated by the pharmacy device 102 and/or the benefit manager device 106 regarding the drugs, or otherwise. The drug data 122 may identify drugs that have a perishable attribute that exceeds a threshold. For example, the drug data 122 may identify drugs that can be temperature controlled for a given period of time before they spoil. The perishable item delivery server 105 may automatically select a window of time having a highest likelihood of a person being present at the delivery location for drugs identified by drug data 122 as having a perishable attribute that exceeds a threshold. Namely, for such drugs, the perishable item delivery server 105 may not give the member a choice as to a delivery window but instead may inform the member that the drug will be delivered within the selected window of time.

The activity data 117 stores activity information received from various IoT devices 132a-b, 133a-b, and 134a-b. The activity information may be stored and separated by location. For example, the activity information received from IoT devices 132a, 133a, and 134a may be stored in association with the first location 130a in activity data 117. Similarly, the activity information received from IoT devices 132b, 133b, and 134b may be stored in association with the second location 130b in activity data 117. The activity information that is received may specify a time or time window in which the respective activity was detected by the respective IoT device 132a-b, 133a-b, and 134a-b and an indication of the type of activity that was detected. The activity information of the activity data 117 is used to generate the location-based presence model 119 by aggregating all of the activity data for a given location and computing likelihoods that a person is present at the location during different time windows. The activity data 117 may be stored and organized in the manner shown and described in FIGS. 3 and 4.

For example, a doorbell device may provide activity information for storage in activity data 117 that identifies a time window and/or specific times at which a doorbell at a given location (e.g., a user's home) was operated or rung within each day of the week for a modeling time period (e.g., 3-4 weeks). Similarly, a garage door device may provide activity information for storage in activity data 117 that identifies a time window and/or specific times at which a garage door was opened/closed at a given location (e.g., a user's home) within each day of the week for the modeling time period (e.g., 3-4 weeks). The multiple weeks are chosen to be of sufficient length to provide statistically significant data related to presence at the location (e.g., a recipient's home). As another example, a doorbell camera device may provide activity information for storage in activity data 117 that identifies a time window and/or specific times when a person was determined to be arriving or approaching the door associated with the doorbell camera device at a given location (e.g., a user's home) within each day of the week for an extended modeling time period (e.g., more than 3-4 weeks or more or over a multiple week period). The doorbell camera device may provide activity information for storage in activity data 117 that identifies a time window and/or specific times when a person was determined to be leaving from the door associated with the doorbell camera device at a given location (e.g., a user's home) within each day of the week for a period of the modeling time period. The doorbell camera device may include an accelerometer that may provide activity information for storage in activity data 117 that identifies a time window and/or specific times when the door associated with the doorbell camera device was swung open or closed and/or the amount of force applied to the door and direction of force at a given location (e.g., a user's home) within each day of the week for the modeling time period. The doorbell camera device may include an accelerometer that may trigger activation of the camera capturing one or more than one images for storage in activity data 117 that can be processed to identify whether a person is entering or leaving during a time window within each day of the week for the modeling time period.

A electrical switch device (e.g., a light switch) may provide activity information for storage in activity data 117 that identifies a time window and/or specific times when the electrical switch device was manually operated at a given location (e.g., a user's home) within each day of the week for the modeling time period. The electrical switch device can be a light switch turning a light ON or OFF. Turning a light on using the electrical switch device may indicate a person is arriving. The electrical switch device can be a networked outlet that can be activated or deactivated remotely.

A voice response system device may provide activity information for storage in activity data 117 that identifies a time window and/or specific times when a command was spoken and received by the voice response system at a given location (e.g., a user's home) within each day of the week for the modeling time period. The voice response system device may be a device that receives verbal commands from a user following a trigger word and performs certain actions (e.g., searches the Internet, activates one or more than one appliances, sets timers, schedules reminders, and so forth) and audibly provides confirmation or responses that result from performing the actions. For example, a user can verbally speak a command to raise blinds in a room and the voice response system device may automatically raise the blinds and audibly confirms to the user that the action of raising the blinds was performed. As another example, the user can verbally speak a command to receive weather information and the voice response system device may search one or more than one sources for weather information at the current location of the voice response system and audibly provides the weather information to the user.

A television device may provide activity information for storage in activity data 117 that identifies a time window and/or specific times when the television was turned ON/OFF and operated at a given location (e.g., a user's home) within each day of the week for the modeling time period.

In some cases, each of the devices 132*a-b*, 133*a-b*, and 134*a-b* computes a respective likelihood that a person is present at the location associated with the 132*a-b*, 133*a-b*, and 134*a-b* for each time window of various time windows. These devices include a processor to execute an algorithm or process to output a presence score and a memory operably connected to the processor to store the algorithm or process and the presence score (likelihood). The respective likelihoods are stored in activity data 117 and used to generate the location-based presence model 119.

In some cases, the smart home provider server 107 communicates with some or all of the devices 132*a-b*, 133*a-b*, and 134*a-b* to obtain the activity information and store the activity information in activity data 117. The smart home provider server 107 may aggregate the obtained activity information to generate the location-based presence model. For example, the smart home provider server 107 may determine the types of activities that are captured by the devices 132*a-b*, 133*a-b*, and 134*a-b* for each of multiple time windows. Namely, the smart home provider server 107 may determine that during a first time window (e.g., 3-5 PM on Monday), devices 132*a* and 133*a* indicated activity at the first location 130*a* but that device 134*a* did not indicate activity. The smart home provider server 107 may in response assign a medium likelihood that a person is present during the first time window at the first location 130*a*. The smart home provider server 107 may determine that during a second time window (e.g., 11-1 PM on Monday), devices 132*a*, 133*a* and 134*a* indicated activity at the first location 130*a*. The smart home provider server 107 may in response assign a high likelihood that a person is present during the second time window at the first location 130*a*. The smart home provider server 107 may determine that during a third time window (e.g., 5-7 PM on Monday), none of the devices 132*a*, 133*a* and 134*a* indicated activity at the first location 130*a*. The smart home provider server 107 may in response assign a low likelihood that a person is present during the third time window at the first location 130*a*. The smart home provider server 107 may generate a location-based presence model 119 that indicates the different likelihoods for the first, second, and third time windows for the first location 130*a*. Likelihood, as used throughout this disclosure, refers to a likelihood score or likelihood value that can be used to determine and measure a confidence that a person is present at a location during a certain time period or window. The location-based presence model 119 may be based on all the likelihood scores across all time periods. In some embodiments, the use of the likelihood scores across all time periods by the location-based presence model 119 improves data integrity and reliability.

The smart home provider server 107 may be in communication with an electronic delivery detection 140. The electronic delivery detection 140 may include a device in communication with the devices 132*a*, 133*a*, and 134*a* at the location 130*a*. The electronic delivery detection 140 may detect when an item or package arrives at the location 130*a* and when the item or package is retrieved by a person at the location 130*a*. Namely, the electronic delivery detection 140 can generate a statistical measure of how long packages remain sitting on a porch or doorstep after being dropped off by a courier before being picked up by a person at the location. The electronic delivery detection 140 may perform such a detection by capturing an image from a doorbell device or camera associated with a front door at the location and processing the image to detect presence of a package or item. The electronic delivery detection 140 then continues monitoring images from the camera to detect when the package or item is no longer present. The electronic delivery detection 140 can then measure the duration between when the package or item was left at the doorstep and became visible to the camera and when the package or item was removed from the doorstep or no longer is visible by the camera. The electronic delivery detection 140 may also determine a time period associated with that delivery and pickup times and store this information in the database 110. The smart home service provider server 107 may use the information collected by the electronic delivery detection 140 to generate the location-based presence model 119.

In some cases, the electronic delivery detection 140 can communicate with a client device, e.g., a patient-related device, a delivery receiver related device, a member user device, or the like, to determine whether the item or package was picked up and delivered to a member or person at the location. For example, the electronic delivery detection 140 may receive a notification from a courier or mail service indicating that a package was delivered to a recipient. The electronic delivery detection 140 can then send a notification and request to the recipient's client device asking the recipient if the package was picked up. Namely, the electronic delivery detection 140 can ask the recipient to confirm receipt of the package that was delivered. In some cases, the recipient may confirm receipt after someone at the location where the package was delivered picks up the package or takes physical possession of the package. The electronic delivery detection 140 can measure the time duration between when the package or item was marked as delivered by the courier service (e.g., left at the doorstep) and when the package or item was received by a person at the location (e.g., when a recipient responds to the notification on the client device indicating that the package was received and picked up). The electronic delivery detection 140 may also determine a time period associated with that delivery and pickup times and store this information in the database 110. The smart home service provider server 107 may use the information collected by the electronic delivery detection 140 to generate the location-based presence model 119.

The smart home provider server 107 may communicate the location-based presence model 119 to the perishable item delivery server 105. The perishable item delivery server 105, based on the location-based presence model 119, may determine that the first time window is associated with a highest likelihood that a person is present at the first location 130*a* during the second time window among multiple time windows (e.g., the first, second and third time windows). The perishable item delivery server 105 may present a ranked list of time windows to a member (e.g., to the patient device 108) to select a delivery time window for delivering a perishable item to the first location 130*a*. In some cases, the perishable item delivery server 105 automatically delivers the perishable item to the first location 130*a* during the first time window associated with a highest likelihood that a person is present at the first location 130*a*, such as if the drug data 122 indicates that the perishable item is associated with a perishable attribute that exceeds a threshold. A member, through the patient device 108, may elect a different time period for delivery. The server may revert to the location-based presence model 119 for the next delivery. That is, the member may opt out of the preferred delivery time that has the most likely presence of a person per the location-based presence model 119. The time windows may be limited to those times a delivery service can arrive at the location (e.g., 7 AM-7 PM or 8 AM-6 PM).

As an example, the smart home provider server 107 may take measurements using the activity data 117 to determine the likelihood of whether any family members, or other resident, are home during certain days and time frames when deliveries are likely to occur. The measurements may be made based on identifying events that indicate home presence. For example, measurements of a doorbell may reflect that 90% of the packages delivered between 3-5 PM are retrieved within a threshold time from delivery (e.g., within 10 minutes). This indicates that a likelihood of a person being present at the location is high for the time window of 3-5 PM.

The time periods may be 9 AM-12 PM, 12 PM-3 PM, 3 PM-5 PM, 5 PM-7 PM, but any other suitable time period may be selected. Time periods of two hours, three hours, four hours, or any other suitable continuous time period can be used. The smart home provider server 107 may determine that 90% of the time a person is home between 3-5 PM on Wednesdays and Thursdays. The smart home provider server 107 may determine that on Mondays a person is not home 80% of the time before 3 PM. The smart home provider server 107 may generate the location-based presence model 119 based on this information. Using the location-based presence model 119, a delivery of perishable items can be scheduled during a time window in which the likelihood of a person being present at the location is high.

As an example, the smart home provider server 107 may take measurements using the activity data 117 to determine the likelihood of whether any family members are home during certain days of the week when deliveries are likely to occur. The measurements may be made based on identifying events that indicate home presence. For example, measurements of a doorbell may reflect that 90% of the packages delivered on Mondays are retrieved within a threshold time from delivery (e.g., within 10 minutes). This indicates that a likelihood of a person being present at the location is high for the time window of the day of the week, Monday.

The time periods may be various days of the week (e.g., weekdays, weekends, and/or weekdays and weekends) as an alternative or addition to specific hours within a given day. The smart home provider server 107 may determine that 80% of the time a person is home between on Mondays, Wednesdays and Thursdays. The smart home provider server 107 may generate the location-based presence model 119 based on this information. Using the location-based presence model 119, a delivery of perishable items can be scheduled during a time window in which the likelihood of a person being present at the location is high.

It will be appreciated that if the item is a drug product, the delivery date may be governed by pharmacy rules. For example, a drug prescription cannot be refilled with more than a fourteen day supply remaining. In such cases, the time period that is selected based on the location-based presence model 119 may consider when prior deliveries of the same prescription were made. When the prescription is being refilled, the location-based presence model 119 may determine that a first time period that falls on a first day (e.g., Monday) is associated with a higher likelihood of a person being present than a second time period that falls on a second day (e.g., Wednesday). However, the location-based presence model 119 may determine that if the refill is delivered on the first day, more than a fourteen day supply remains with the patient (e.g., because the refill would be delivered too soon after the prior delivery) and delivery on the first day would thereby violate pharmacy rules. In addition, the location-based presence model 119 may determine that if the refill is delivered on the second day, less than a fourteen day supply remains with the patient on the second day and delivery on the second day would not violate pharmacy rules. In such cases, the location-based presence model 119 may select the second time period that falls on the second day for delivering the refill of the prescription rather than the first time period that falls on the first day even though the second time period is associated with a lower likelihood of a person being present at the location or home than the first time period.

In some cases, each device 132*a*, 133*a*, and 134*a* provides a presence score indicating how confident the respective device is that a person is present at the location during a given time window. The presence scores are combined to develop an overall presence score for the time window. The overall presence score is then used to generate the location-based presence model 119 for the location. In some cases, different device categories or types are used to assign a likelihood of presence of a person at a location. For example, a first device type that is configured to determine whether a person arrives/leaves a location may indicate a first activity, and a second device type that is configured to determine whether a person is present at the location may indicate a second activity. The smart home provider server 107 may detect information identifying the first and second activities occurring within the same time window and in response may assign to the time window a high likelihood of a person being present at the location in that time window. However, if the smart home provider server 107 detects only the first or only the second activity within a given time window, the smart home provider server 107 may assign to the given time window a low or medium likelihood of a person being present at the location in the given time window. The smart home provider server 107 and/or the perishable item delivery server 105 may individually or together implement a location-based presence model system shown in FIG. 2 for generating the location-based presence model 119.

The location-based presence model system may generate the location-based presence model 119 based on all of the time periods during every day of the week, a selected number of time periods and/or selected days of the week, a specified set of time periods (e.g., during which heuristics indicate high likelihood of home presence), and/or any other suitable time period. In some cases, the location-based presence model 119 may be generated as a graph across time over a modeling time window that indicates various degrees of likelihood of home presence during the modeling time window. An illustrative graph is shown in FIG. 4B.

Figure 4B:
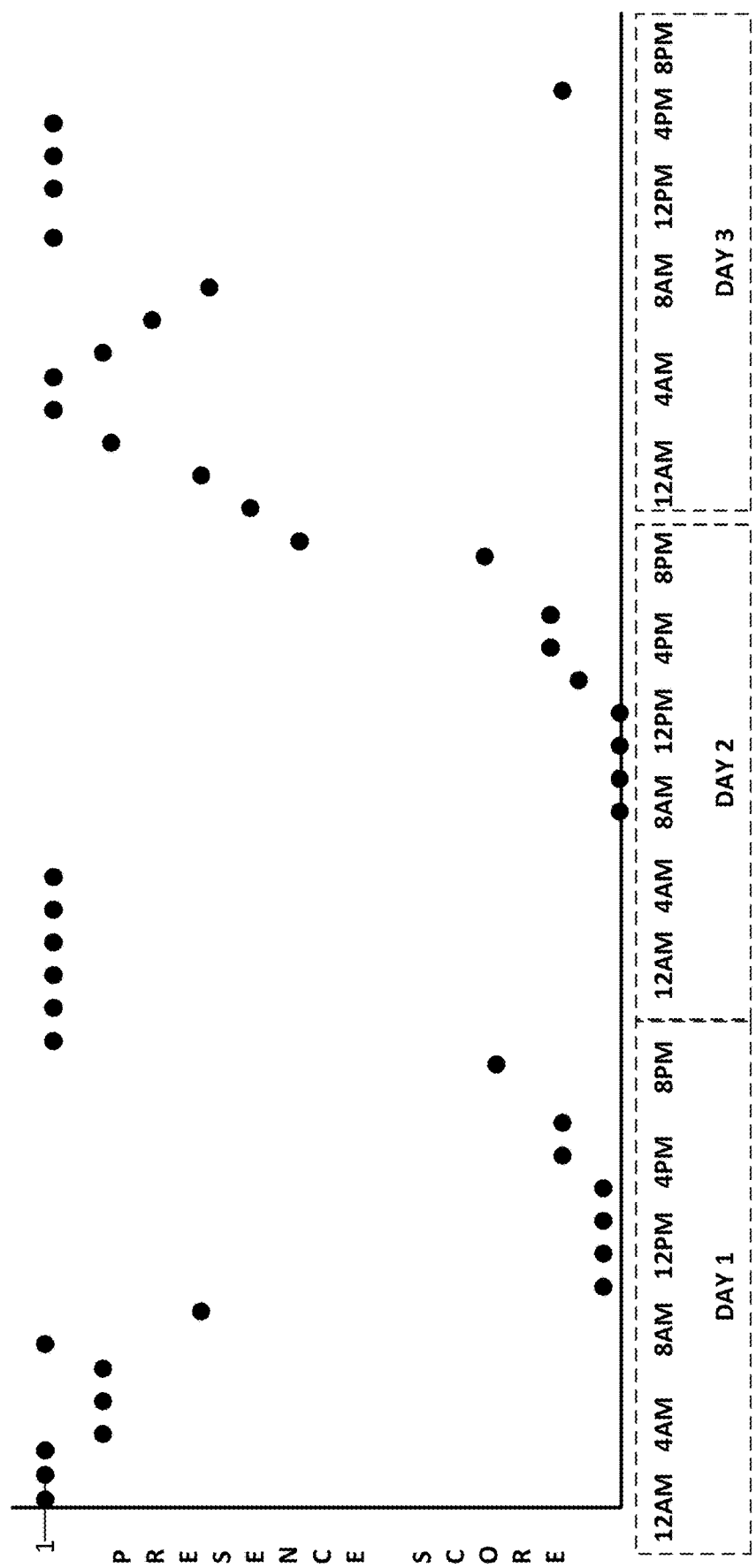

As shown in FIG. 4B, normalized likelihoods across multiple time windows across multiple days may be generated. For example, on day 1 between the time window of 12 AM and 4 AM, the likelihood is normalized to the maximum value of 1. Between the time window of 8 AM and 4 PM on day 1, the likelihood is the lowest value of 0. Multiple likelihoods at predetermined time points (e.g., every 10 minutes or every hour) during a given time window (e.g., a time window that extends four hours) can be normalized and added to the graph shown in FIG. 4B. The likelihoods are the normalized presence scores. The location-based presence model 119 can analyze the pattern shown in FIG. 4B over a month, week, day, or hourly to determine the best time window (e.g., the window with the most likelihood that a person is home for delivery) to present to a user or to automatically select for delivering the perishable items. As an example, in the graph shown in FIG. 4B, the time window on day 3 (e.g., Thursday) from 11 AM to 4 PM may be a good candidate for the time window when a person is present at the location to receive the perishable item. In some embodiments, the selected delivery window can also trigger when the automated pharmacy fills a prescription. The controller for the automated pharmacy may initiate a refill based on fulfillment time in the pharmacy and the delivery time window so that the prescription arrives at the delivery location during the selected time window (e.g., on day 3 between 11 AM to 4 PM).

While the system 100 in FIG. 1 is shown to include single devices 102, 106, and 108, multiple devices may be used. The devices 102, 106, and 108 may be the same type of device or may be different device types. When multiple devices are present, the multiple devices may be of the same device type or may be of different device types. Moreover, system 100 shows a single network 104; however, multiple networks can be used. The multiple networks may communicate in series with each other to link the devices 102, 106, and 108 or in parallel to link the devices 102, 106, and 108. The multiple networks may communicate in series or in parallel with each other to link the IoT devices 132a-b, 133a-b,1 and 134a-b associated with respective locations 130a-b with the servers 105 and/or 107.

Figure 2:
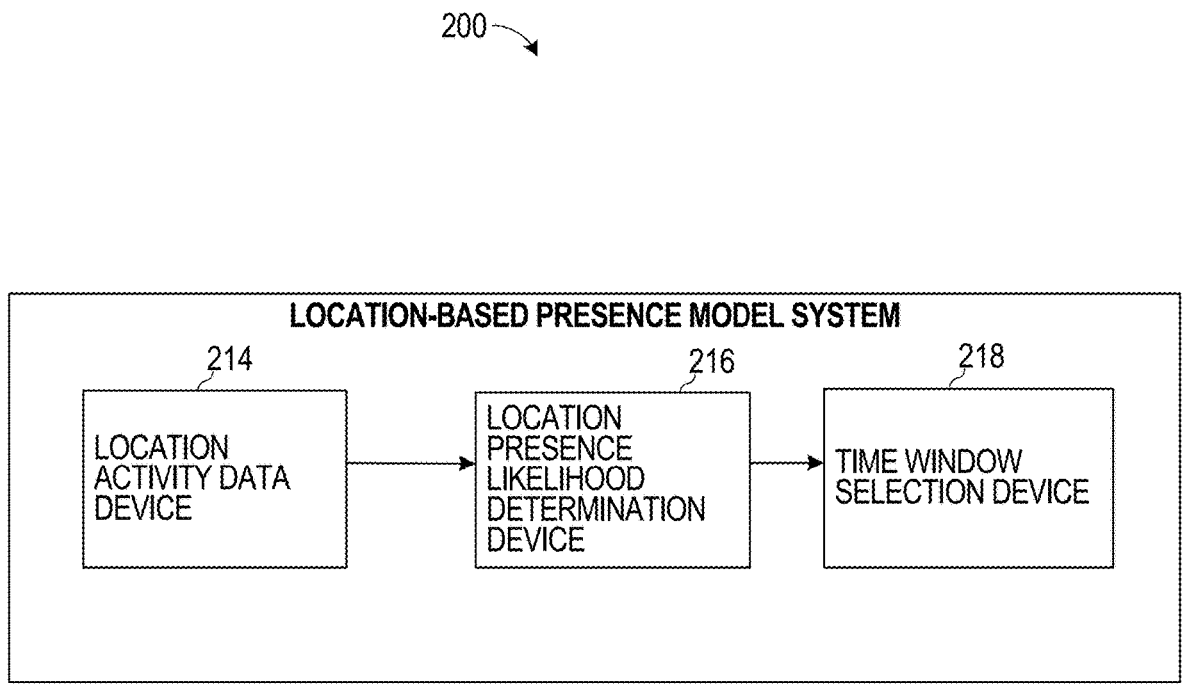
FIG. 2 is a block diagram of an example location-based presence model system that may be deployed within the system of FIG. 1, according to some embodiments.

FIG. 2 is a block diagram of an example location-based presence model system 200 that may be deployed within the system of FIG. 1, according to some embodiments. The location-based presence model system 200 includes a location activity data device 214, a location presence likelihood determination device 216, and a time window selection device 218. The location activity data device 214 collects, over a threshold period of time (e.g., over 3-4 weeks or multiple months), activity data from various IoT devices 132a-b, 133a-b, and 134a-b for different locations, respectively. In some cases, the location activity data device 214 receives input from a member associated with a given location that provides permissions with different levels of information that the location activity data device 214 is authorized to obtain. For example, a given IoT device 132a, such as a doorbell, may be capable of collecting video activity that identifies people that approach the door as well as ringing or notification activity identifying when someone presses a doorbell button. The member may only give permission to the location activity data device 214 to collect doorbell ringing or notification activity information and not any video information. In such cases, the location activity data device 214 may receive from the given IoT device 132a doorbell ringing activity information identifying when the doorbell was operated or activated during each of a plurality of time windows.

The location activity data device 214 generates a table that lists various time windows and corresponding activities or lack of activities detected during each respective time window. For example, a first time window in the table may indicate that first, second, third, and fourth activities were detected and that fifth and sixth activities were not detected. A second time window in the table may indicate that first, second, and fourth activities were detected and that third, fifth, and sixth activities were not detected. Each activity in the table may be assigned a weight that indicates a confidence level that the activity type that is detected is actually indicative of a person being present at the location. For example, a light switch being turned ON may be associated with a low confidence level if the light switch was remotely operated (e.g., through a mobile device application or from a vehicle) to be in the ON position (meaning that a person was not at the location to switch on the lights). However, the light switch being turned ON may be associated with a high confidence level if the light switch was manually operated to be in the ON position. The light switch can be an IoT device 132-134. Similarly, a voice response system may be associated with a high confidence level in indicating presence of a person because such a system requires a person to be physically present at the location to operate the system and thereby cause the system to report activity. An illustrative table generated by the location activity data device 214 is provided in FIG. 4A.

The location presence likelihood determination device 216 processes and aggregates the activity data obtained and stored by the location activity data device 214 to generate the location-based presence model 119. Specifically, the location presence likelihood determination device 216 processes the activity data received during a first time window from various IoT devices 132a, 133a, and 134a to generate a first likelihood value. The first likelihood value may be a percentage, a numerical value, and/or a discrete level (e.g., low, medium, or high). The first likelihood value may be stored in association with the first time window in the table shown in FIG. 4A. The location presence likelihood determination device 216 processes the activity data received during a second time window from various IoT devices 132a, 133a, and 134a to generate a second likelihood value. The second likelihood value may be a percentage, a numerical value, and/or a discrete level (e.g., low, medium, or high). The second likelihood value may be stored in association with the second time window in the table shown in FIG. 4A. The location presence likelihood determination device 216 similarly processes all the activities listed for the remaining time windows to generate and store likelihoods for each time window shown in FIG. 4A.

The location presence likelihood determination device 216 may use various heuristics, various weightings, and/or machine learning systems to generate the likelihood values for each time window. As an example, the location presence likelihood determination device 216 uses the logic information stored in a database shown in FIG. 3 to generate the likelihood of presence values. For example, the location presence likelihood determination device 216 may determine that for a given time window, the activity data indicates that a front door was opened, a light switch was activated, a refrigerator was opened, and a television was turned ON. The location presence likelihood determination device 216 may further determine that all of these activities were detected in a given sequence and within a threshold amount of time of each other (e.g., less than 10 minutes apart). In response, the location presence likelihood determination device 216 may determine, based on the database shown in FIG. 3, that the given time window is associated with a high likelihood of a person being present at the location during the given time window. As another example, the location presence likelihood determination device 216 may determine that during a second time window, a front door was opened and a television was turned ON. In response, the location presence likelihood determination device 216 determines that the second time window is associated with a medium likelihood of a person being present at the location during the second time window. As another example, the location presence likelihood determination device 216 may determine, for a third time window, a garage door was opened and that all other devices associated with the location reported no activity. In response, the location presence likelihood determination device 216 may determine, based on the database shown in FIG. 3, that the third time window is associated with a low likelihood of a person being present at the location during the third time window. As another example, the location presence likelihood determination device 216 may determine, for a fourth time window, a garage door was opened and a light switch was manually turned ON. In response, the location presence likelihood determination device 216 may determine, based on the database shown in FIG. 3, that the fourth time window is associated with a high likelihood of a person being present at the location during the fourth time window. The likelihood determination device 216 may store the likelihood values in a record in the database and associate this data with the member or patient.

In some embodiments, the location presence likelihood determination device 216 may determine whether a majority of the devices during a given time window reported activity but not all of the devices. In such cases, the location presence likelihood determination device 216 may assign a medium likelihood to the given time window. In some embodiments, the location presence likelihood determination device 216 may determine whether a minority of the devices during a given time window reported activity. In such cases, the location presence likelihood determination device 216 may assign a low likelihood to the given time window. In some embodiments, the location presence likelihood determination device 216 may determine that all of the devices during a given time window reported activity. In such cases, the location presence likelihood determination device 216 may assign a high likelihood to the given time window.

In some embodiments, the location presence likelihood determination device 216 generates a time window based on the location activity data device 214. Specifically, the location presence likelihood determination device 216 may determine that a doorbell device in a location indicates that a person has arrived and entered the location at 8 AM consistently every Monday and Thursday during consecutive weeks (e.g., three or more weeks). For example, the doorbell device may determine that an image of a person grows in size indicating that a person is approaching the door followed by the door being opened, which indicates a person has arrived and entered the location. The location presence likelihood determination device 216 may also determine that another device in the house, such as a voice response system, detects activity for two hours after the person has arrived and entered the location at 8 AM. The voice response system can control an audio or a visual system. The continued use of the voice response system, e.g., to start/stop songs, start/stop a video, or change a channel, indicates that a person is present at the location. The location presence likelihood determination device 216 may also determine that the doorbell device at the location indicates that a person has left the location at 10:30 AM. For example, the doorbell device may determine that an image of a person shrinks in size indicating that a person is walking away from the door preceded by the door being opened, which indicates a person is leaving the location. The activation of the camera capturing images can be triggered by motion of the door or the doorbell device.

Based on the combination of activities reported by the devices at the location over the course of three weeks or a modeling time period, the location presence likelihood determination device 216 may determine that the window of time between 8 AM and 10:30 AM has a highest likelihood of a person being present at the location than other time windows. In such cases, the location presence likelihood determination device 216 may indicate this window to the time window selection device 218 for use in delivering a perishable item to the location. In some cases, the perishable item is packed and delivered using delivery parameters (e.g., cooling material and packaging and a transportation mode) that prevents spoilage of the perishable item for the duration of the time window (e.g., 3 hours) plus a threshold amount of time (e.g., 2 hours) and transit time. These delivery parameters may consume less resources than typical delivery parameters that prevent spoilage of the perishable item for significantly longer times, e.g., 12 hours or more due to the transit times. Because there is a high likelihood of a person being at the location during the selected time window, there is a very low risk of spoilage of the perishable items with the reduced delivery parameters.

The time window selection device 218 receives the likelihoods of each of the time windows generated by the location presence likelihood determination device 216. In some cases, the time window selection device 218 automatically selects a time window for delivering a perishable item to a location based on the likelihood values. For example, the time window selection device 218 compares the likelihood value of each time window for a location with a threshold. In response to determining that first and second time windows are associated with a likelihood value that exceeds the threshold, the time window selection device 218 selects the first and second time windows. In some implementations, the time window selection device 218 then compares the likelihood values of the first and second time windows and selects the time window with the higher likelihood value. The time window selection device 218 automatically uses the selected time window to deliver a perishable item to the location if the perishable item is associated with perishable attributes that exceed a threshold. In some implementations, the time window selection device 218 presents a list of the top three time windows to a member or consumer (e.g., the time windows with the three highest likelihood values displayed on a device) to allow the member or consumer to select a time window for delivering a perishable item to the location of the member or consumer (e.g., using input to the display device). In some cases, the time window selection device 218 selects a time window with a highest likelihood value and includes the selected time window among other time windows. The time window selection device 218 may indicate that the selected time window is associated with a preferred delivery window which may include a reduced shipping cost and allows the consumer or member to select the selected time window instead of the other time windows to receive the perishable item for a benefit, e.g., discounted or free shipping.

FIGS. 5-6 are illustrative inputs and outputs of the location-based presence model system, according to example embodiments. FIG. 5 shows a graphical user interface presented to a member or consumer to allow the member or consumer to select which devices 132a, 133a, and 134a the member or consumer allows to share activity information with the smart home service provider server 107. The graphical user interface shown in FIG. 5 also allows the user to specify a rank or selection for each device indicating how accurately the device is able to indicate presence of a person at the location. The rank that is assigned is used to compute the overall likelihood of a person being present for each time window. For example, if a majority of low accuracy devices report activity during a particular time window, the location presence likelihood determination device 216 may assign a low likelihood to the particular time window. However, if a majority of medium accuracy devices report activity during a particular time window, the location presence likelihood determination device 216 may assign a high likelihood to the particular time window. The graphical user interface shown in FIG. 5 also allows the member or consumer to specify for some of the listed devices a level of information the member or consumer allows to be shared. For example, a given device may generate multiple types of information (e.g., time at which the device was operated, type of operation, an identity of the user who operated the device, and an image of the user who operated the device). The member or consumer may specify a low level of sharing be enabled for the given device, meaning that the device can only share minimal information including the time of operation and type of operation but not the identity of the user or image of the user who operated the device.

FIG. 6 shows a graphical user interface allowing the member or consumer to select a time window for delivery of a perishable item. The time window selection device 218 may indicate that a selected time window (e.g., 12 PM-3 PM) is associated with a reduced shipping cost and allows the consumer or member to select the selected time window instead of the other time windows to receive the perishable item for discounted or free shipping.

Figure 7:
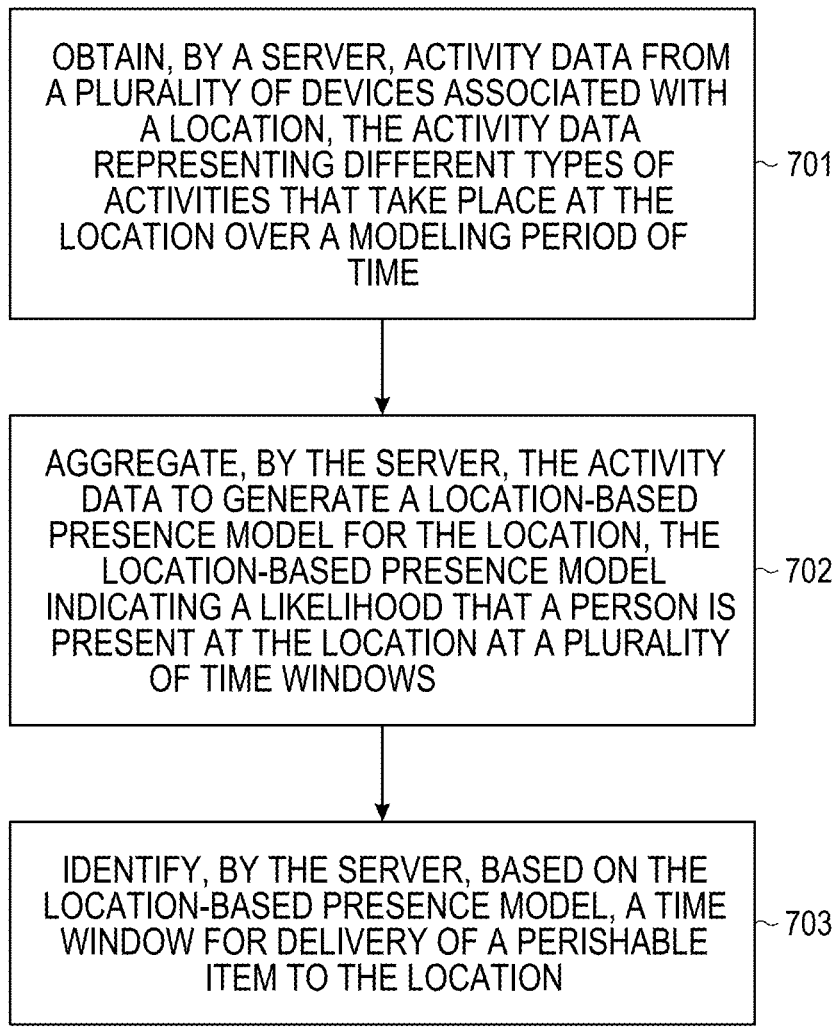
FIG. 7 is a flowchart illustrating example operations of the location-based presence model system, according to example embodiments.

FIG. 7 is a flowchart illustrating example operations of the location-based presence model system in performing process 700, according to example embodiments. The process 700 may be embodied in computer-readable instructions for execution by one or more than one processors such that the operations of the process 700 may be performed in part or in whole by the functional components of the smart home service provider server 107 and/or the perishable item delivery server 105; accordingly, the process 700 is described below by way of example with reference thereto. However, in other embodiments, at least some of the operations of the process 700 may be deployed on various other hardware configurations. Some or all of the operations of process 700 can be in parallel, out of order, or entirely omitted.

At operation 701, the location-based presence model system obtains activity data from a plurality of devices associated with a location, the activity data representing different types of activities that take place at the location over a modeling period of time.

At operation 702, the location-based presence model system aggregates the activity data to generate a location-based presence model for the location, the location-based presence model indicating a likelihood that a person is present at the location at a plurality of time windows.

At operation 703, the location-based presence model system identifies, based on the location-based presence model, a time window for delivery of a perishable item to the location.

Figure 8:
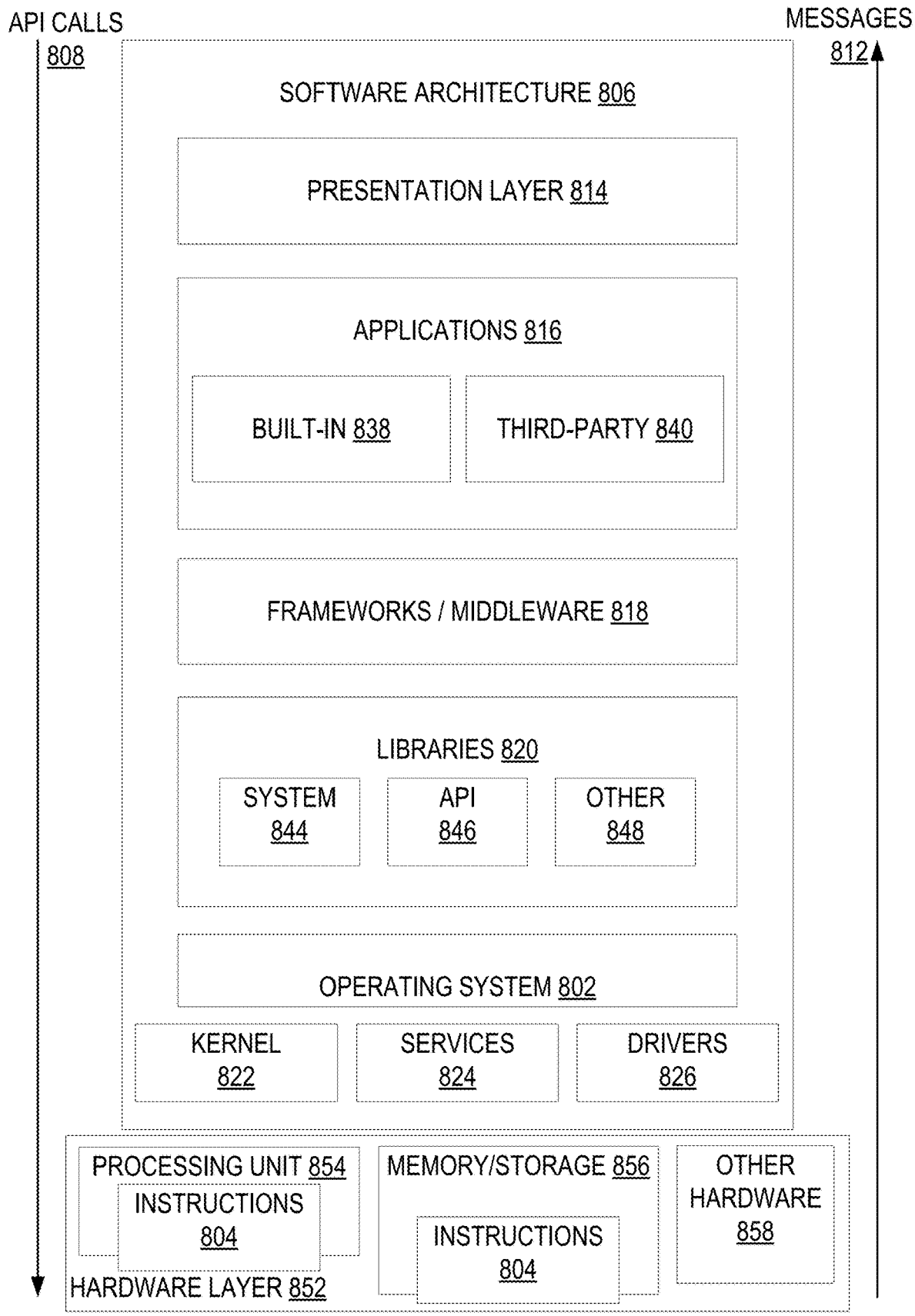
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage devices memory/storage 856, which also have executable instructions 804. The hardware layer 852 may also comprise other hardware 858. The software architecture 806 may be deployed in any one or more than one of the components shown in FIG. 1 (e.g., perishable item delivery server 105, smart home service provider server 107, and/or devices 132a, 133a, 134a). The software architecture 806 can be utilized to generate the location-based presence model 119 and to generate likelihoods of when a person is present at a location to control delivery of (e.g., identify preferred time windows for delivering) packages to the location.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/devices.

The frameworks/middleware 818 (also sometimes referred to as middleware) provide a higher-level common infrastructure that may be used by the applications 816 and/or other software components/devices. For example, the frameworks/middleware 818 may provide various graphic user interface functions, high-level resource management, high-level location services, and so forth. The frameworks/middleware 818 may provide a broad spectrum of other APIs that may be utilized by the applications 816 and/or other software components/devices, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
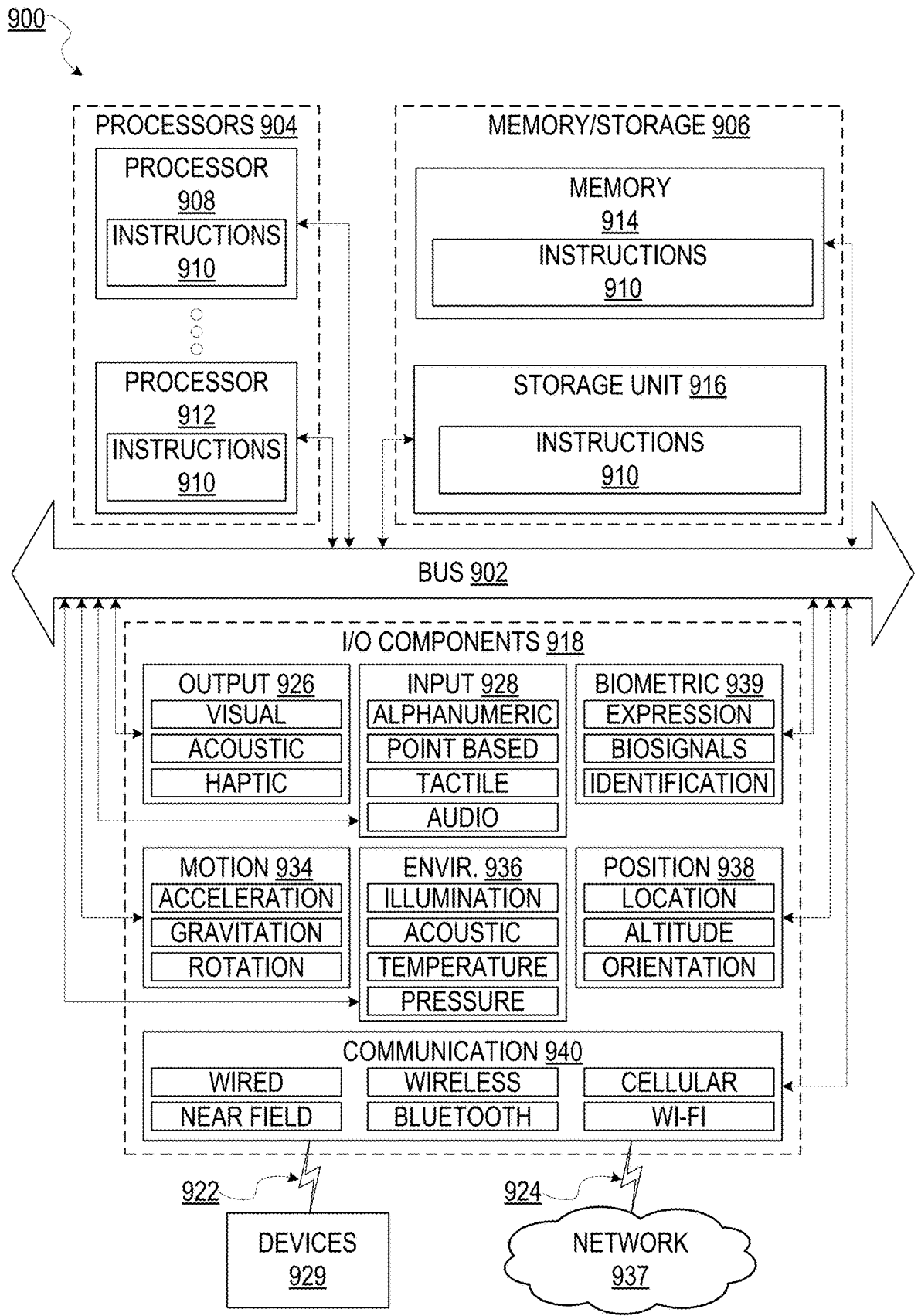
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. For example, the instructions 910 may be executed by the smart home service provider server 107 to generate the location-based presence model 119 and to identify preferred time windows for delivering items to a location.

As such, the instructions 910 may be used to implement devices or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, electronic delivery detection 140, perishable item delivery server 105, smart home service provider server 107, device 132a, device 133a, device 134a, device 132b, device 133b, device 134b, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, database 110, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on, such as devices 132a-b, 133a-b, and 134a-b. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more than one thermometer that detect ambient temperature), humidity sensor components, pressure sensor components (e.g., barometer), acoustic sensor components (e.g., one or more than one microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 929 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

The present disclosure at times uses a two hour time window for purposes of illustration, e.g., 1-3 PM, 3-5 PM, etc. The present disclosure encompasses time windows of different lengths, e.g., one hour greater than two hours, four hours, or eight hours. The location-based model can adjust the length of a delivery time window based on the sensed data that a person is present at the location. These delivery time periods can be dynamic, e.g., a base window is two hours that can be started earlier or later depending on the likelihood that a person is present at the location.

The time windows as described herein can be used to determine a suitable delivery route, e.g., the travel of a delivery truck, the walking path of a delivery person, flight of an unmanned aerial vehicle (UAV) or other delivery systems to deliver the ordered object(s). Thus, the inputs from the devices providing information about the presence of an individual at the location, e.g., residence, work place or third location, can be responsible for part for the delivery route determination.

Glossary

"TIME WINDOW" in this context refers to a one hour window, a two hour window, a day of the week, a day of the month, a time of day, and so forth.

"BENEFITS" a member may receive refers to points in an award program, discount on co-pay or shipping costs, reduction in medical visits or care, free home health checkups, exclusive deals, exclusive marketing offers, discounts in shared partnerships, preferred shipping or delivery time windows, free or reduced cost content or videos, preferred access to limited supply or access-limited items, and so forth.

"ACTIVITY" in this context refers things that are indicative if a human is present at a location. For example, a human communicating with and instructing a voice response system at a location to perform certain actions, is indicative of the human being present at the location. As another example, a human is physically activating or deactivating an electronic switch at a location, is indicative of the human being present at the location. As another example, a human walking through a front door or opening and closing a garage, is indicative of the human being present at the location. As another example, a combination of actions performed by a human at a location is activity that is indicative of a human being present at the location. Specifically, a human opening a garage door followed within a specified time period by opening a refrigerator, is indicative of the human being present at the location.

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a LAN, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second. The timestamp can be part of the data packet received from any of the devices that provide input to the servers for determining the model or delivery time window as described herein. The timestamp can be the time the signal is received in the server in an example.

Changes and modifications may be made to the disclosed embodiments without departing from the scope of the present disclosure. These and other changes or modifications are intended to be included within the scope of the present disclosure, as expressed in the following claims.

Other example embodiments of the present disclosure may include the following. A system including one or more processors coupled to a memory comprising non-transitory computer instructions that when executed by the one or more processors perform operations comprising: (1) obtaining, by a server, activity data from a plurality of devices associated with a location, the activity data representing different types of activities that take place at the location over a modeling period of time; (2) aggregating, by the server, the activity data to generate a location-based presence model for the location, the location-based presence model indicating a likelihood that a person is present at the location at a plurality of time windows; and (3) identifying, by the server, based on the location-based presence model, a time window from the plurality of time windows for delivery of a perishable item to the location.

A non-transitory computer readable medium comprising non-transitory computer-readable instructions for performing operations comprising: (1) obtaining, by a server, activity data from a plurality of devices associated with a location, the activity data representing different types of activities that take place at the location over a modeling period of time; (2) aggregating, by the server, the activity data to generate a location-based presence model for the location, the location-based presence model indicating a likelihood that a person is present at the location at a plurality of time windows; and (3) identifying, by the server, based on the location-based presence model, a time window from the plurality of time windows for delivery of a perishable item to the location.

A non-transitory computer readable medium as described above, wherein the location is a home or residence, wherein the plurality of devices is associated with one or more than one occupants of the home or the residence; and wherein each of the plurality of devices is connected to the server via the Internet or other communication network.

The prior patent documents, U.S. Pat. No. 8,600,903 and application Ser. No. 14/630,373, which were incorporated by reference, include disclosure that can be incorporated with the present disclosure. However, if the present disclosure and the disclosure in these two documents conflicts, then the present document controls.

The present application uses the terms patient, client and member (and words of similar import) to describe various entities and devices with relation to delivery systems. These terms can be used interchangeably with respect to the delivery system and determining a time delivery model. In an example of drug delivery, the delivery can be made to patient location, a client location or a member location. In some examples, a patient or client can receive the delivery and a member can be part of group purchasing organization, a pharmacy benefits, or the like. The present disclosure is not so limited in all example embodiments.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A drug delivery modeling system, comprising:
   a garage door opener, at a first location, to control operation of a garage door and to output a garage door activation signal;
   a voice activated device, at the first location, to receive a voice command and to output a voice presence signal;
   a security device, at the first location, to sense presence at an exterior location and to output a presence signal, wherein the security device comprises a camera to capture a plurality of images at different times in response to the security device sensing first delivery of a package at the exterior location, at least one of the images indicating subsequent removal of the package from the exterior location;
   a light, at the first location, to selectively and at least partially illuminate the first location and to output a light activation signal;
   a server configured to identify a duration between acquisition of the plurality of images indicating the first delivery of the package at the exterior location and the removal of the package from the exterior location based at least in part on the presence signal,
   wherein the server is configured to receive an electronic permission from a user device associated with the garage door activation signal, the voice presence signal, and the presence signal to produce a time window model using the garage door activation signal, the voice presence signal, the light activation signal, the plurality of images, the duration between the acquisition of the plurality of images indicating the first delivery of the package at the exterior location and the removal of the package from the exterior location, and the presence signal at which a presence is likely at the first location; and
   a delivery system to schedule a second delivery of a perishable drug during a scheduled delivery time window indicated by the time window model.

2. The drug delivery modeling system of claim 1, wherein the security device includes a video doorbell configured to sense when a door is moved and to output a motion signal and a video image, wherein the server is configured to produce the time window model using the motion signal and the video image from the video doorbell.

3. The drug delivery modeling system of claim 2, wherein the delivery system is configured to predict when a person is likely present at the first location to receive the second delivery over a time period of at least one week using the time window model.

4. The drug delivery modeling system of claim 2, wherein the delivery system is configured to rank at least three time windows to determine the scheduled delivery time window indicated by the time window model.

5. The drug delivery modeling system of claim 2, wherein the perishable drug delivery modeling system is configured to account for weather on a predicted route of the drug during transport from a pharmacy to the first location for the second delivery during the schedule delivery time window in scheduling the second delivery.

6. The drug delivery modeling system of claim 2, wherein the video doorbell is configured to process the video image to determine if a person is exiting the door by the motion signal occurring before a person video part enters a field of view and becomes smaller in the video image or a person is approaching the door by the person video part becoming larger before the motion signal occurs.

7. The drug delivery modeling system of claim 1, wherein a first image of the plurality of images captured by the camera of the security device contains a delivered perishable drug, and wherein a second image, captured after the first image, of the plurality of images is absent of the delivered perishable drug.

8. The drug delivery modeling system of claim 1, further comprising an internet of thing (IoT) device, at a second location, configured to output a second location presence signal, and wherein the server is configured to receive the second location presence signal and to produce a second time window model using the garage door activation signal, the voice presence signal, the presence signal, and the second location presence signal at which a presence is likely at the second location.

9. The drug delivery modeling system of claim 8, wherein the server is configured to:
   obtain activity data from a plurality of devices associated with the second location, the activity data representing different types of activities that take place at the second location over a modeling period of time;
   aggregate the activity data to generate a location-based presence model for the second location, the location-based presence model indicating a likelihood that a person is present at the second location at a plurality of time windows; and
   identify, based on the location-based presence model, a time window from the plurality of time windows for delivery of a perishable item to the first location.

10. An apparatus comprising:
    a garage door at a first location, the garage door having an operation sensor;
    a voice command device at the first location, the voice command device having a voice detection sensor;
    a security device at the first location near a door, the security device configured to detect a first delivery of a package at a door-exterior location;
    a camera communicatively coupled with the security device, the camera configured to capture a plurality of images of the door-exterior location of the first location near the door at different times in response to the security device sensing the first delivery of the package at the door-exterior location, the plurality of images including a first image indicating the delivery of the package at the door-exterior location and a second image indicating subsequent removal of the package from the door-exterior location;

a light configured to selectively and at least partially illuminate the first location, the light having a light activation sensor; and a server configured to receive a garage door activation signal from the operation sensor, a voice presence signal from the voice detection sensor, a security presence signal from the security device, the first image and the second image, and a light activation signal from the light activation sensor, wherein the server is configured to determine a duration between acquisition of the first image and the second image, wherein the server is configured to generate activity data comprised of the garage door activation signal, the voice presence signal, the security presence signal, the duration between the acquisition of the first image and the second image, and the light activation signal to aggregate the activity data, the server configured to then produce a time window model of when a presence is likely at the first location and to schedule a second delivery of a perishable drug based on the time window model.

11. The apparatus of claim 10, wherein the first location is a home of a user, and wherein the light is configured to be activated by the user who is one chosen from present in the home and approaching the home.

12. The apparatus of claim 10, wherein the security device includes a video doorbell communicatively coupled with the operation sensor, the video doorbell configured to process a recorded video of the door-exterior location in response to the operation sensor sending a door motion signal, wherein the video doorbell is configured to determine a person is exiting a home if the door motion signal occurs before the person is captured on the recorded video, and wherein the video doorbell is configured to determine the person is entering the home if the door motion signal occurs after the person is captured on the recorded video.

13. The apparatus of claim 10, further comprising an internet of thing (IoT) device, at a second location, the IoT device configured to provide an IoT signal to the server, wherein the server is configured to generate second activity data comprised of the IoT signal to produce a second location-based presence model for the second location, the second location-based presence model indicating a likelihood that a user is present at the second location, and further wherein the server is configured to compare the time window model of the first location with the second location-based presence model to schedule the second delivery of the perishable drug at one of the first location or the second location when the user is likely at the one of the first location or the second location.

14. The apparatus of claim 10, wherein the first image captures presence of the package, and wherein the second image captures absence of the package.

15. The apparatus of claim 14, wherein the package contains the perishable drug.

16. The apparatus of claim 15, wherein the server is configured to generate activity data comprised of a plurality of garage door activation signals, a plurality of voice presence signals, a plurality of security presence signals, a plurality of the respective first images, a plurality of respective the second images, and a plurality of light activation signals from over a time period of at least a week.

17. The apparatus of claim 16, wherein the server is configured to produce time windows of when the presence is likely at the first location based on the time window model, wherein the server is configured to rank at least three of the time windows and schedule the second delivery of the perishable drug during a highest ranked time window from the at least three of the time windows that were ranked.

18. An apparatus comprising:

a motion sensor in a first location at a door;

a camera facing a door-exterior location at the first location, the camera configured to capture a first image in response to the motion sensor sensing an operation of the door;

a security device at the first location, the security device configured to sense presence or absence of at least one of a person or a package, wherein the camera is configured to capture a second image in response to the security device sensing presence of the at least one of the person or the package, and wherein the camera is configured to capture a third image in response to the security device sensing absence of the package;

at least one of a light having a light activation sensor at the first location or a voice command device at the first location, the voice command device having a voice detection sensor;

a server configured to generate activity data based on a motion signal from the motion sensor, a difference between the first image, the second image, and the third image that were captured by the camera at a first time, a second time, and a third time, respectively, at least one of a light activation signal from the light activation sensor or a voice presence signal from the voice detection sensor, wherein the server is configured to determine a duration between acquisition of the second image and the third image;

a pharmacy benefit manager device communicatively coupled with the server, the pharmacy benefit manager device configured to receive an electronic permission from a user device associated with motion sensor, the camera, the security device, the light, and the voice command device, the permission indicating different levels of information a user of the user device allows to be shared by each of the motion sensor, the camera, the security device, the light, or the voice command device; and wherein the server is configured to receive the electronic permission and a permitted level of information of the activity data and aggregate the permitted level of information of the activity data to generate a location-based presence model for the first location based at least in part on the duration between the acquisition of the second image and the third image, the location-based presence model indicating a likelihood that the user is present at the first location during at least one time window to schedule a delivery of a perishable drug during the at least one time window.

19. The apparatus of claim 18, further comprising a plurality of Internet of Things (IoT) devices at a second location, the plurality of IoT devices configured to output a plurality of second location presence signals, wherein the server receives the plurality of second location presence signals, aggregate the plurality of second location presence signals, and generate a second location-based presence model for the second location indicating a likelihood that the user is present the second location during the at least one time window to schedule the delivery of the perishable drug during the at least one time window at the second location.

20. The apparatus of claim 19, wherein the server is configured to rank the location-based presence model for the first location and the second location-based presence model for the second location to schedule the delivery of the perishable drug to which is ranked higher of the first location and the second location during the at least one time window.

\* \* \* \* \*